US012564978B2

(12) United States Patent
Tanaka et al.

(10) Patent No.: US 12,564,978 B2
(45) Date of Patent: Mar. 3, 2026

(54) SLICED TOPPING ALIGNMENT

(71) Applicant: LAB2FAB, LLC, Fremont, CA (US)

(72) Inventors: Samuel Tanaka, San Leandro, CA (US); Cory Lent, Campbell, CA (US); John Paul Norman, San Jose, CA (US)

(73) Assignee: Lab2Fab, LLC, Fremont, CA (US)

( * ) Notice: Subject to any disclaimer, the term of this patent is extended or adjusted under 35 U.S.C. 154(b) by 846 days.

(21) Appl. No.: 17/902,733

(22) Filed: Sep. 2, 2022

(65) Prior Publication Data

US 2023/0065122 A1     Mar. 2, 2023

Related U.S. Application Data

(60) Provisional application No. 63/240,351, filed on Sep. 2, 2021.

(51) Int. Cl.
| | |
|---|---|
| *B26D 7/18* | (2006.01) |
| *A21C 9/04* | (2006.01) |
| *A21D 13/22* | (2017.01) |
| *A21D 13/41* | (2017.01) |
| *B26D 1/147* | (2006.01) |
| *B26D 7/06* | (2006.01) |

(52) U.S. Cl.
CPC .............. *B26D 7/1818* (2013.01); *A21C 9/04* (2013.01); *A21D 13/22* (2017.01); *A21D 13/41* (2017.01); *B26D 1/147* (2013.01); *B26D 7/0683* (2013.01); *B26D 2210/02* (2013.01)

(58) Field of Classification Search
None
See application file for complete search history.

(56) References Cited

U.S. PATENT DOCUMENTS

| | | | | |
|---|---|---|---|---|
| 4,852,441 A | * | 8/1989 | Anders | B26D 7/34 99/534 |
| 4,960,025 A | * | 10/1990 | Fitch | B26D 7/34 83/411.2 |
| 5,921,170 A | | 7/1999 | Khatchadourian et al. | |
| 6,526,874 B1 | | 3/2003 | Khatchadourian et al. | |
| 8,710,408 B2 | | 4/2014 | Khatchadourian et al. | |
| 2008/0178749 A1 | | 7/2008 | Stutman | |
| 2011/0059209 A1 | | 3/2011 | Khatchadourian | |
| 2012/0185086 A1 | | 7/2012 | Khatchadourian et al. | |
| 2012/0308702 A1 | | 12/2012 | Khatchadourian et al. | |
| 2014/0087048 A1 | | 3/2014 | Webster et al. | |

(Continued)

OTHER PUBLICATIONS

International Search Report and Written Opinion of the International Searching Authority in relation to International Application No. for PCT application No. PCT/US2022/042534, dated Mar. 9, 2023, 10 pages.

(Continued)

*Primary Examiner* — John J Norton
(74) *Attorney, Agent, or Firm* — Van Hoven PC; Joshua Van Hoven; Stefan D. Osterbur

(57) ABSTRACT

Apparatuses, systems, and methods are presented herein for slicing a food topping for placing upon a food ingredient. A topping holder is configured to position a topping stock. A blade is configured to slice the topping stock via relative motion between the topping holder and the blade. A deflector is configured to force a leading edge of the sliced portion of the topping stock away from the blade as the sliced portion moves relative to the blade.

18 Claims, 11 Drawing Sheets

(56) References Cited

U.S. PATENT DOCUMENTS

| | | | |
|---|---|---|---|
| 2014/0324607 | A1 | 10/2014 | Frehn et al. |
| 2014/0351068 | A1 | 11/2014 | Renfroe |
| 2015/0164131 | A1 | 6/2015 | Vardakostas et al. |
| 2017/0024789 | A1 | 1/2017 | Frehn et al. |
| 2017/0221296 | A1 | 8/2017 | Jain et al. |
| 2017/0290345 | A1 | 10/2017 | Garden et al. |
| 2017/0290454 | A1 | 10/2017 | Hall et al. |
| 2018/0317690 | A1 | 11/2018 | Staton et al. |
| 2018/0338504 | A1* | 11/2018 | Lavri ........................ A21C 3/02 |
| 2019/0125126 | A1 | 5/2019 | Cohen |
| 2019/0216266 | A1 | 7/2019 | Ganninger |
| 2019/0261671 | A1* | 8/2019 | Vardakostas ............ A23P 20/20 |
| 2020/0070377 | A1* | 3/2020 | Jaureguibeitia Olalde .................. B26D 1/18 |
| 2020/0249660 | A1 | 8/2020 | Rao et al. |
| 2020/0253423 | A1* | 8/2020 | Saccone, Jr. ............. B26D 3/28 |
| 2022/0202023 | A1* | 6/2022 | Frea ......................... B26D 1/02 |
| 2023/0390955 | A1* | 12/2023 | Webster ............... B26D 7/0641 |

OTHER PUBLICATIONS

SEVideo Primary, Automatic-Pizzeria (video). Accessible at https://
www.automatic-pizzeria.com/, accessed Sep. 14, 2020 (screenshot
of initial video noting URL is attached)

* cited by examiner

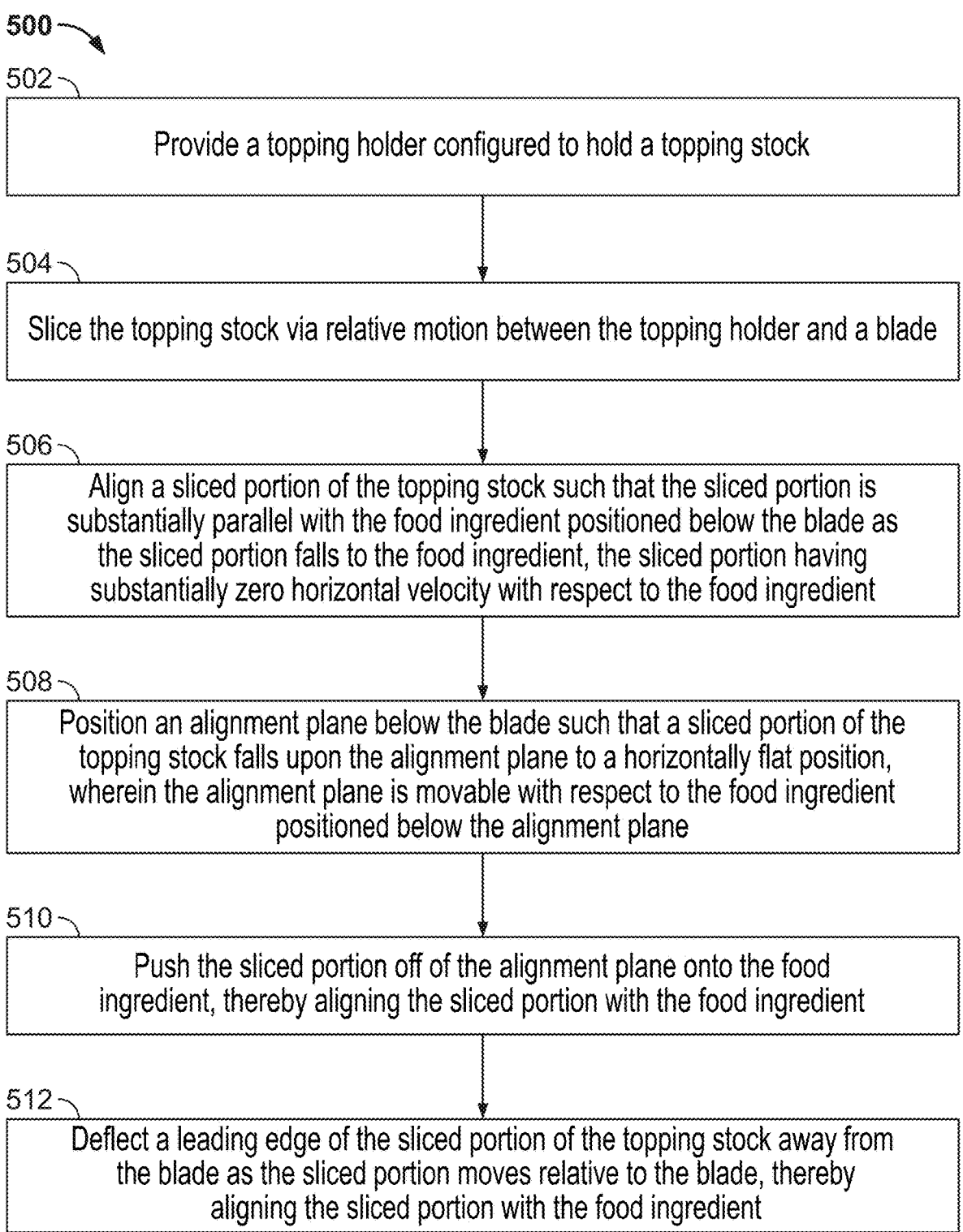

500

502

Provide a topping holder configured to hold a topping stock

504

Slice the topping stock via relative motion between the topping holder and a blade

506

Align a sliced portion of the topping stock such that the sliced portion is substantially parallel with the food ingredient positioned below the blade as the sliced portion falls to the food ingredient, the sliced portion having substantially zero horizontal velocity with respect to the food ingredient

508

Position an alignment plane below the blade such that a sliced portion of the topping stock falls upon the alignment plane to a horizontally flat position, wherein the alignment plane is movable with respect to the food ingredient positioned below the alignment plane

510

Push the sliced portion off of the alignment plane onto the food ingredient, thereby aligning the sliced portion with the food ingredient

512

Deflect a leading edge of the sliced portion of the topping stock away from the blade as the sliced portion moves relative to the blade, thereby aligning the sliced portion with the food ingredient

FIG. 9A
900
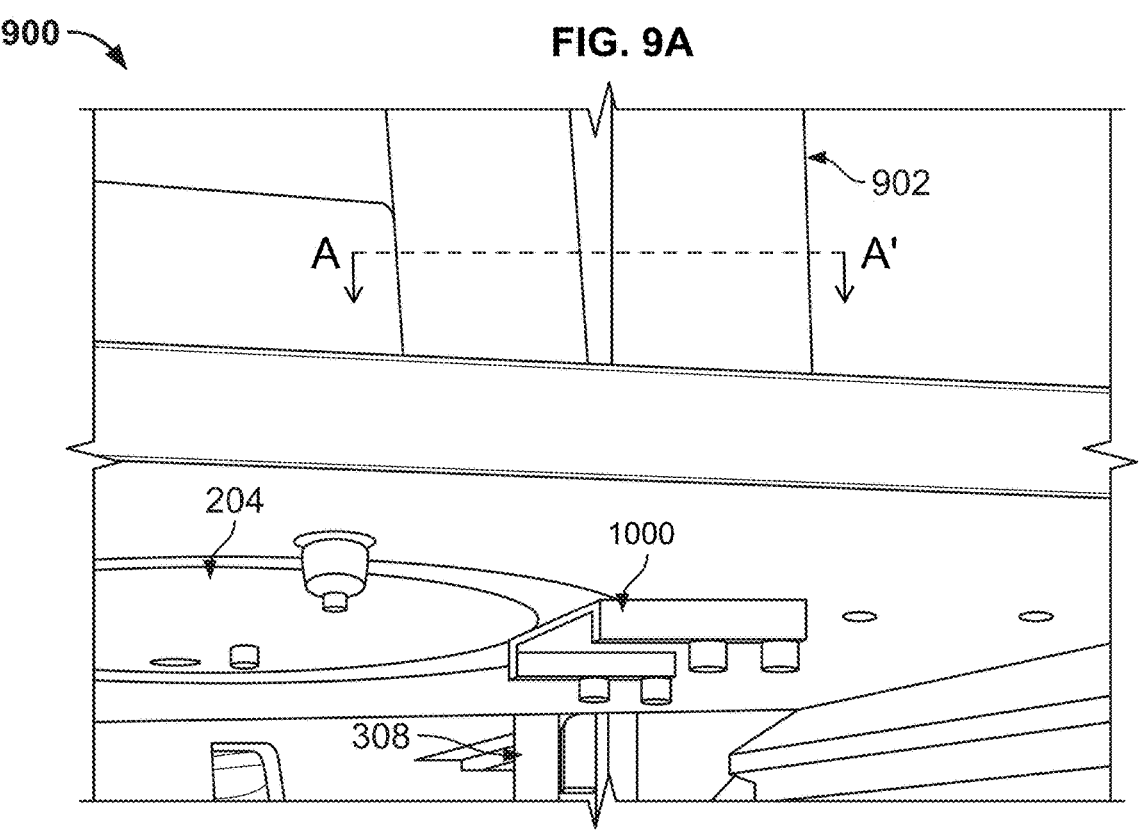
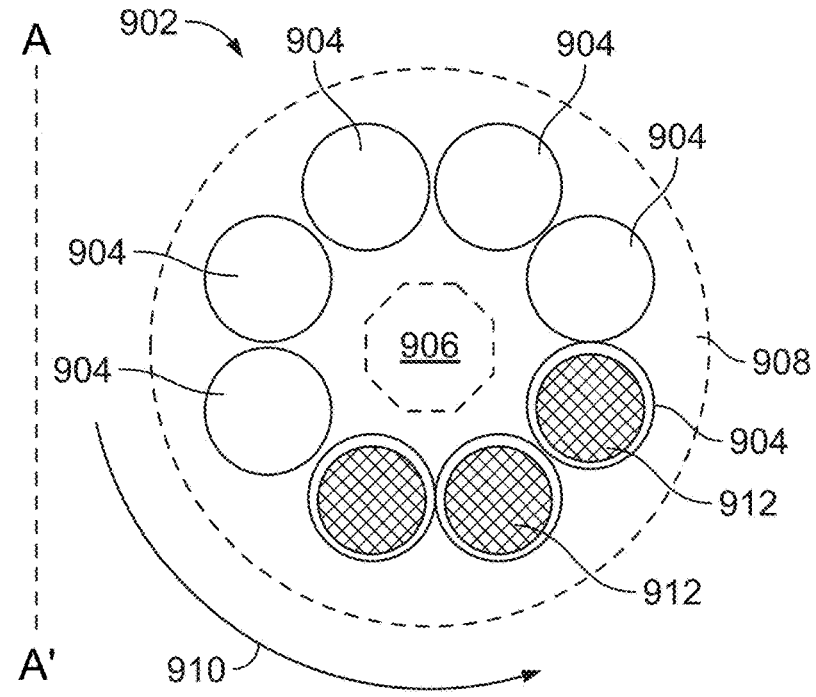
FIG. 9B

SLICED TOPPING ALIGNMENT

CROSS-REFERENCE TO RELATED APPLICATIONS

This application claims the benefit of U.S. Provisional Patent Application No. 63/240,351 filed Sep. 2, 2021, the disclosure of which is hereby incorporated by reference herein in its entirety.

INTRODUCTION

The present disclosure is directed to apparatuses, systems, and methods for slicing a food topping, and more particularly, to apparatuses, systems and methods that slice and place toppings on consumable items.

SUMMARY

Automated food preparation systems may apply a topping to a consumable item. In one example, a pepperoni stick is sliced to create pepperoni slices, which fall upon a pizza dough positioned below a slicing mechanism that slices the pepperoni. However, the pepperoni slices may be erratically distributed about the pizza dough surface as there is a lack of controlled distribution of the pepperoni once sliced. This results in sliced product being unevenly distributed about a consumable item surface (e.g., some areas of the consumable item surface may be overloaded with the sliced product while other areas may have sparse or may lack any sliced product). Accordingly, there is a need for an improved system for slicing food stock (e.g., a topping such as pepperoni) and strategically placing the sliced food stock upon a surface of a consumable item (e.g., a surface of pizza dough).

The present disclosure, in at least some example approaches, describes an apparatus for slicing at least one of a food topping or a consumable stock for placing upon at least one of a food ingredient or consumable item. In some embodiments, the apparatus comprises a topping holder, a blade, and a deflector. The topping holder is configured to position a topping stock. The blade is configured to slice the topping stock via relative motion between the food holder and the blade. The deflector is configured to force a leading edge of the sliced portion of the topping stock away from the blade as the sliced portion moves relative to the blade.

In one example, the food topping is pepperoni. Pepperoni, in a topping stock form, often is provided as a stick or other cylindrical shape. A stick of pepperoni may be placed within the topping holder. The blade is configured to slice the stick of pepperoni into slices of a predetermined thickness. For example, the blade may rotate about an axis that is perpendicular to a slicing plane of the blade such that as the stick of pepperoni is translated down or along the food holder, a first end of the stick may enter a slicing plane of the blade as it rotates. The blade is configured to at least one of slice or rotate independent of motion of the food holder. In some examples an alignment plane may be arranged or positioned below the blade, and may receive slices of the pepperoni stock. The slices of the pepperoni fall onto the alignment plane such that the slices are arranged in a horizontally flat position on the alignment plane. The pusher causes the slices to be pushed off of the alignment plane onto a food ingredient, such as a dough of a pizza, which results in controlled and intentional even distribution of the slices on the dough. These techniques solve the problems of other approaches described above. In particular, this approach does not rely on manual placement of sliced portions of topping stock. Thus, the food ingredient with the sliced portions may be prepared with repeatable arrangements of the sliced portions enabling the automated food preparation to regularly meet or satisfy production criteria. Additionally, this approach does not require toppings to arrive sliced or does this approach require manual slicing of toppings for arrangement on an ingredient. By having a topping holder which is configured to feed topping stock to a blade, automated slicing and arrangement of toppings reduces manual effort as well as improves repeatable quality of consumable items.

In some embodiments, an apparatus comprises an alignment plane positioned below the blade such that a sliced portion of the topping stock falls upon the alignment plane to a horizontally flat position. The alignment plane may be movable with respect to the food ingredient positioned below the alignment plane. In some embodiments, the apparatus comprises a pusher configured to move the sliced portion off of the alignment plane onto the food ingredient.

In some embodiments, the alignment plane and pusher are configured to place the sliced portion of the topping stock upon the food ingredient such that the sliced portion of the topping stock has substantially zero horizontal velocity with respect to the food ingredient. The food ingredient includes one or more of a dough, a sauce, or a cheese. The topping stock may be an encased meat or a pepperoni. The blade is a rotating blade.

In at least some embodiments, an apparatus is provided for slicing a food topping for placing upon a food ingredient. The apparatus may include a topping holder configured to position a topping stock, a blade configured to slice the topping stock via relative motion between the topping holder and the blade.

The apparatus may be configured to align a sliced portion of the topping stock such that the sliced portion is aligned with the food ingredient positioned below the blade as the sliced portion falls to the food ingredient. In one example approach, an alignment plane is positioned below the blade such that a sliced portion of the topping stock falls upon the alignment plane to a horizontally flat position. The alignment plane may be movable with respect to the food ingredient positioned below the alignment plane. The apparatus may further include a pusher configured to move the sliced portion off of the alignment plane onto the food ingredient.

In some example approaches, the alignment plane and pusher are configured to place the sliced portion of the topping stock upon the food ingredient such that the sliced portion of the topping stock has substantially zero horizontal velocity with respect to the food ingredient. The pusher may, merely in one example, be stationary with respect to the topping holder.

In some embodiments, the disclosure is directed to a method of slicing a food topping for placing upon a food ingredient. A topping holder is provided, wherein the topping holder is configured to hold a topping stock. The topping stock is sliced via relative motion between the topping holder and a blade. The method may also include deflecting a leading edge of the sliced portion of the topping stock away from the blade as the sliced portion moves relative to the blade, thereby aligning the sliced portion with the food ingredient.

In at least some embodiments, the method comprises positioning an alignment plane below the blade such that a sliced portion of the topping stock falls upon the alignment plane to a horizontally flat position, wherein the alignment plane is movable with respect to the food ingredient positioned below the alignment plane. The sliced portion is pushed off of the alignment plane onto the food ingredient, thereby aligning the sliced portion with the food ingredient.

In at least some example methods, deflecting the leading edge of the sliced portion of the topping stock away from the blade comprises contacting the sliced portion with an engagement surface of a deflector positioned adjacent the blade.

In at least some example approaches, a method further includes orienting the engagement surface such that the engagement surface defines an oblique angle with respect to a direction of the relative motion between the topping holder and the blade.

BRIEF DESCRIPTIONS OF THE DRAWINGS

The above and other objects and advantages of the disclosure may be apparent upon consideration of the following detailed description, taken in conjunction with the accompanying drawings, in which.

Figure 1:
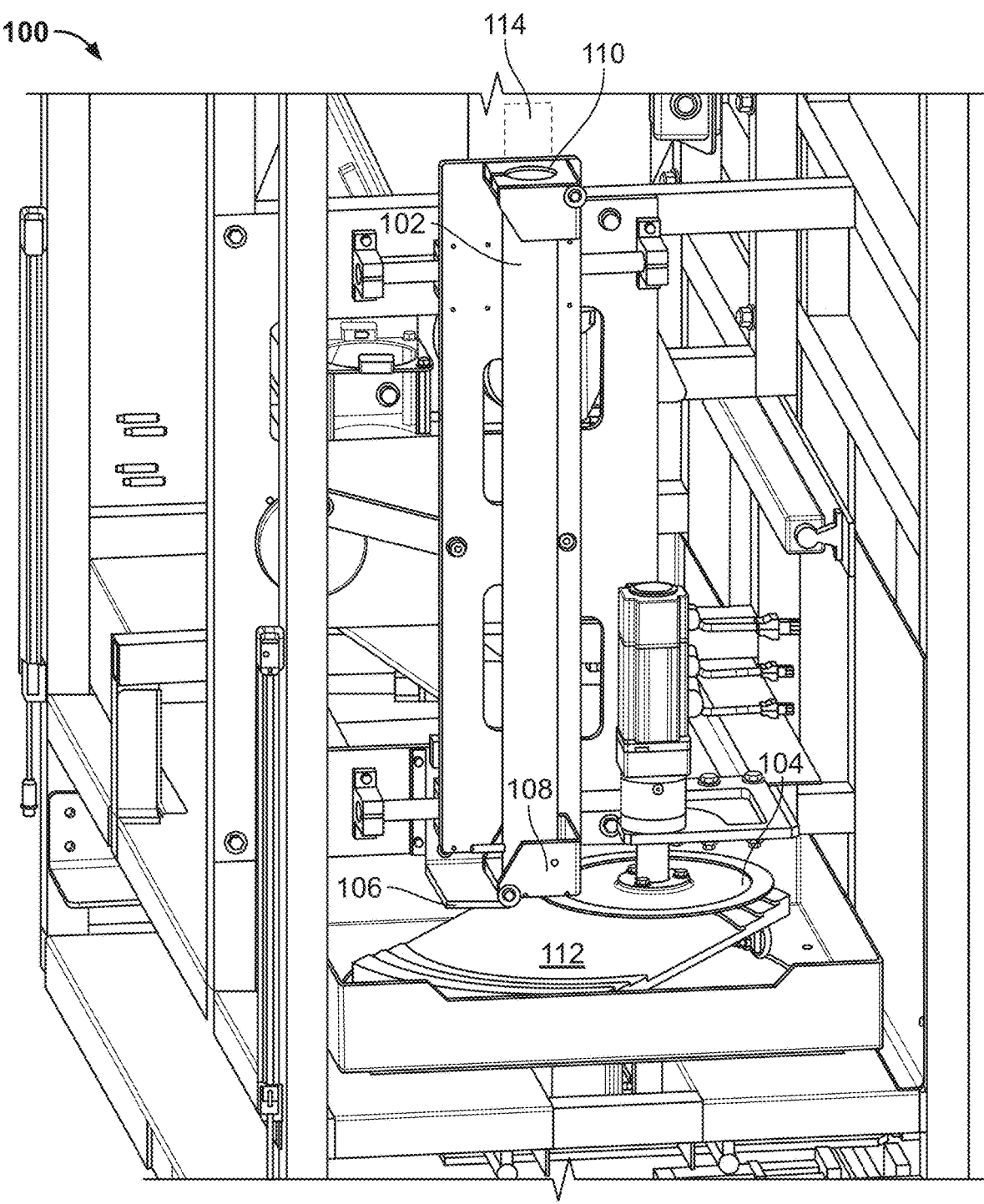
FIG. 1 depicts an illustrative perspective view of an example system or apparatus for slicing a food topping for placing on a consumable item, in accordance with some embodiments of the disclosure.
Figures 3A, 3B, 3C, 3D:
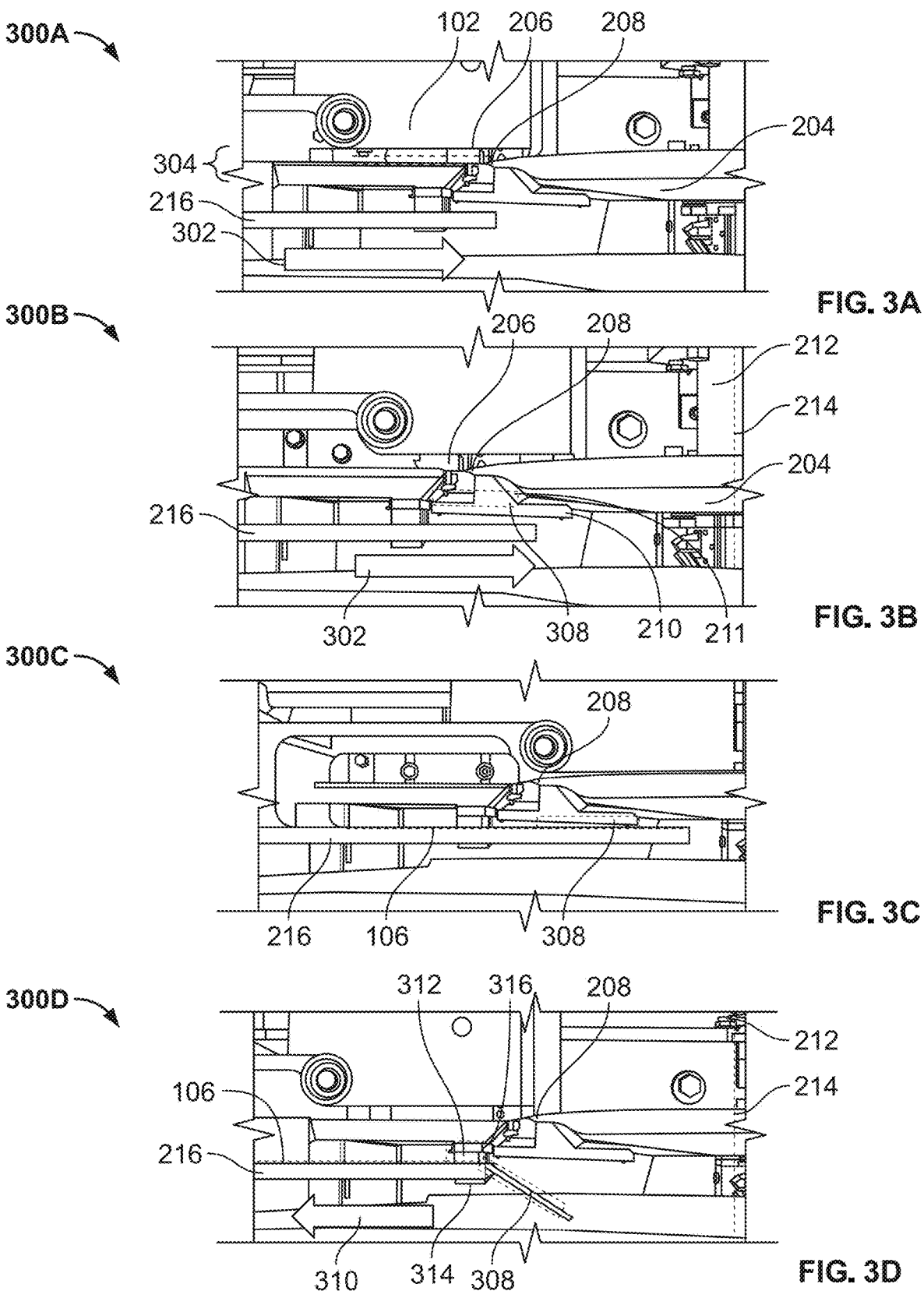
Figures 3E, 3F, 3G:
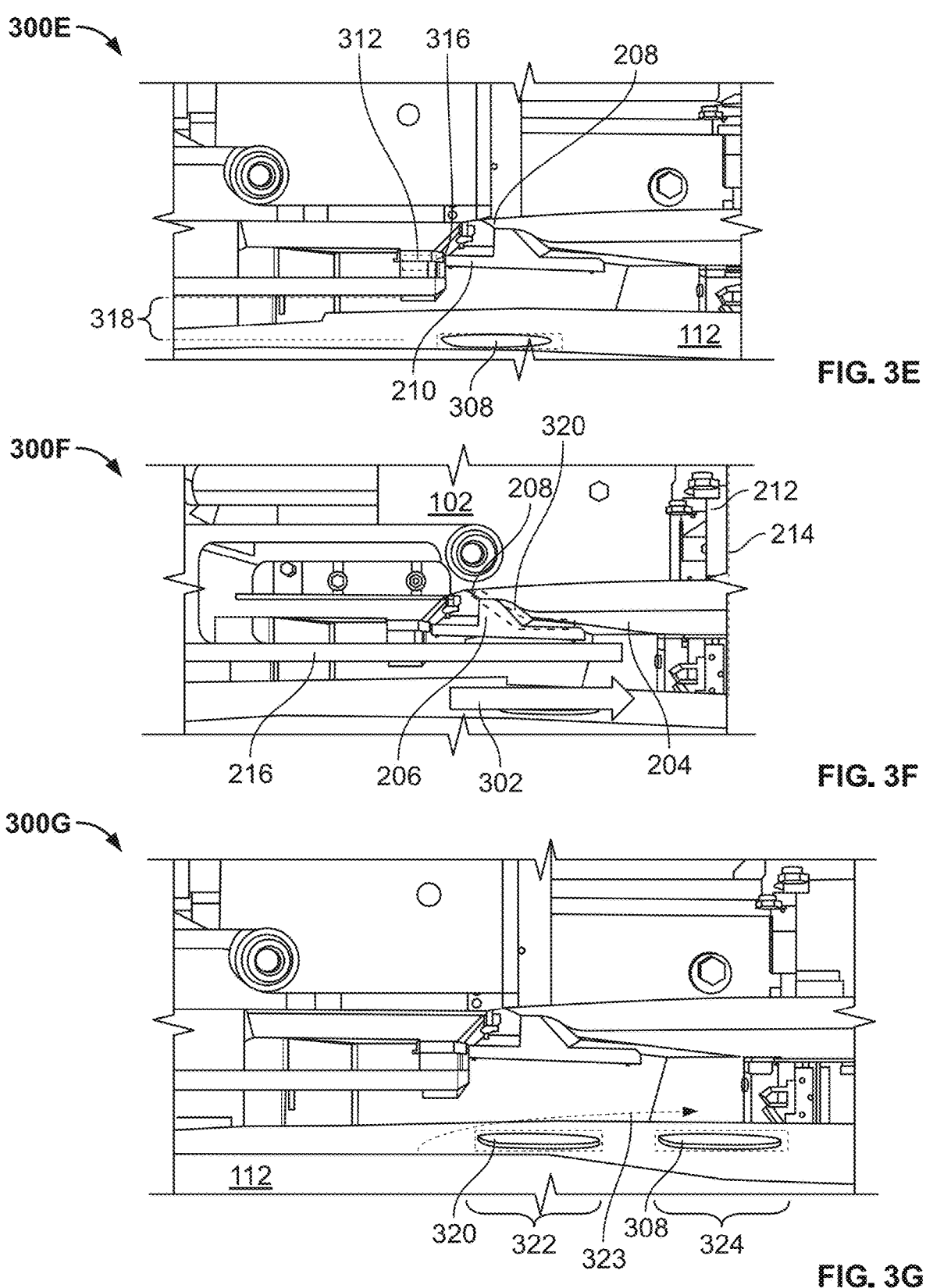
Figure 4:
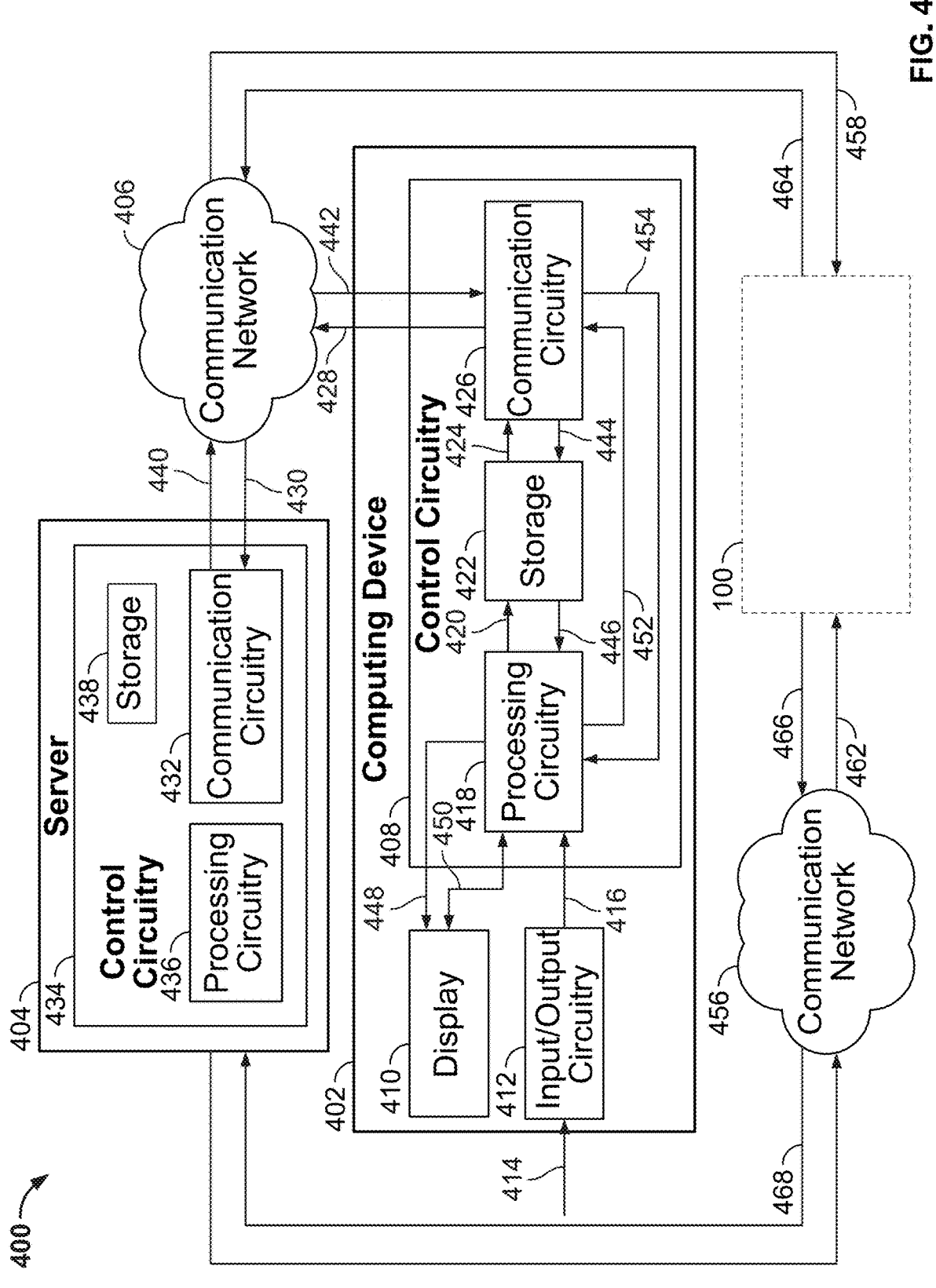
Figures 6A, 6B, 6C:
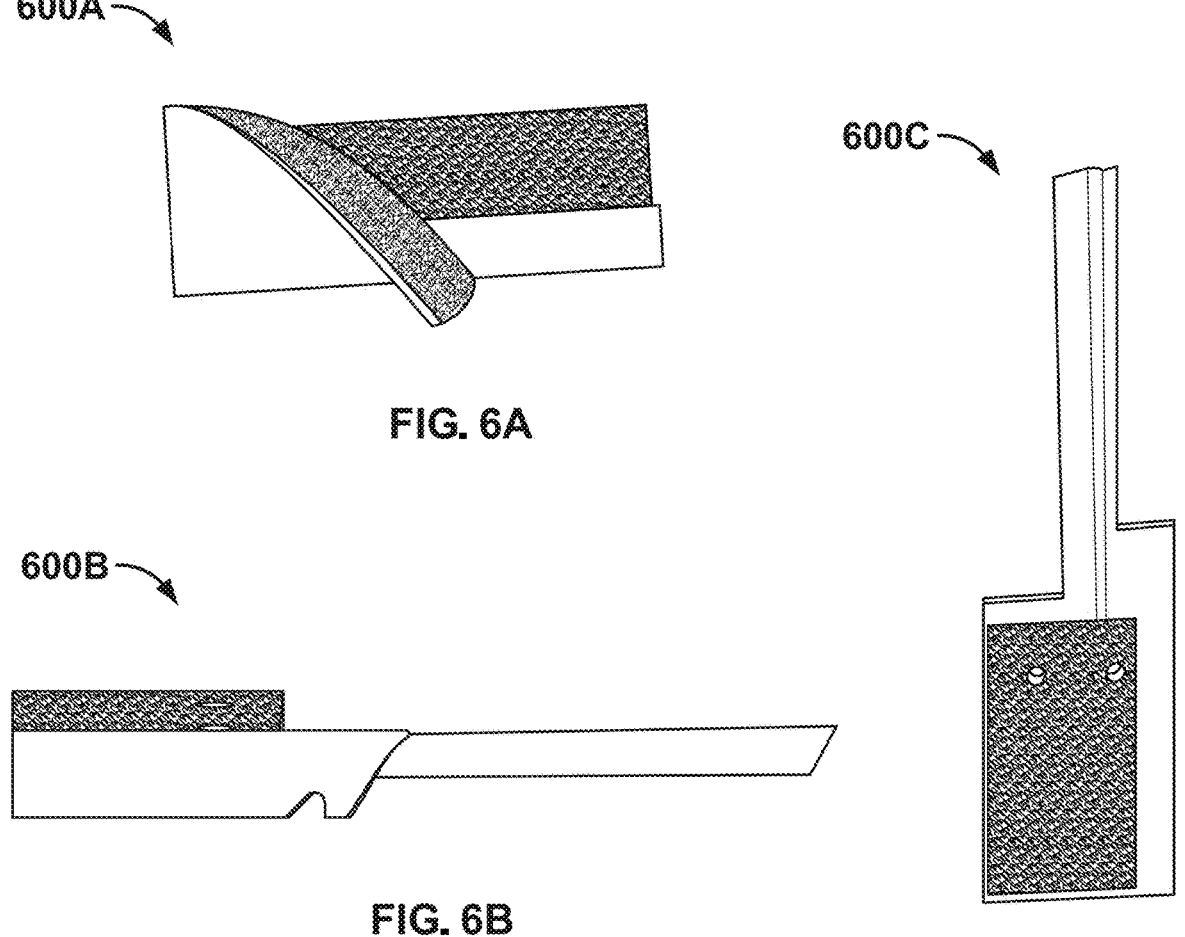
Figure 7A:
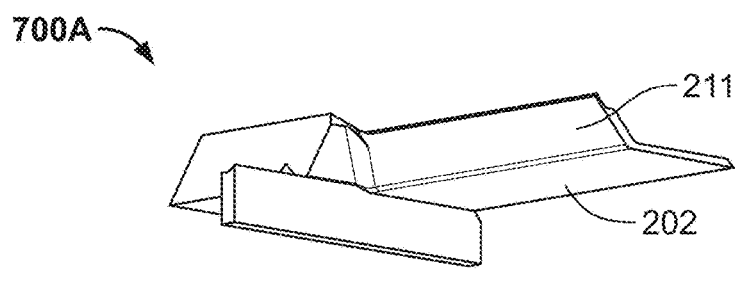
Figure 7B:
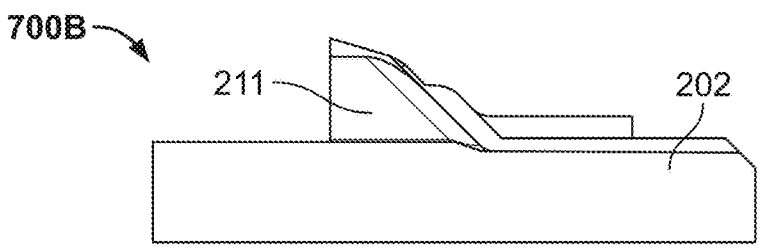
Figure 7C:
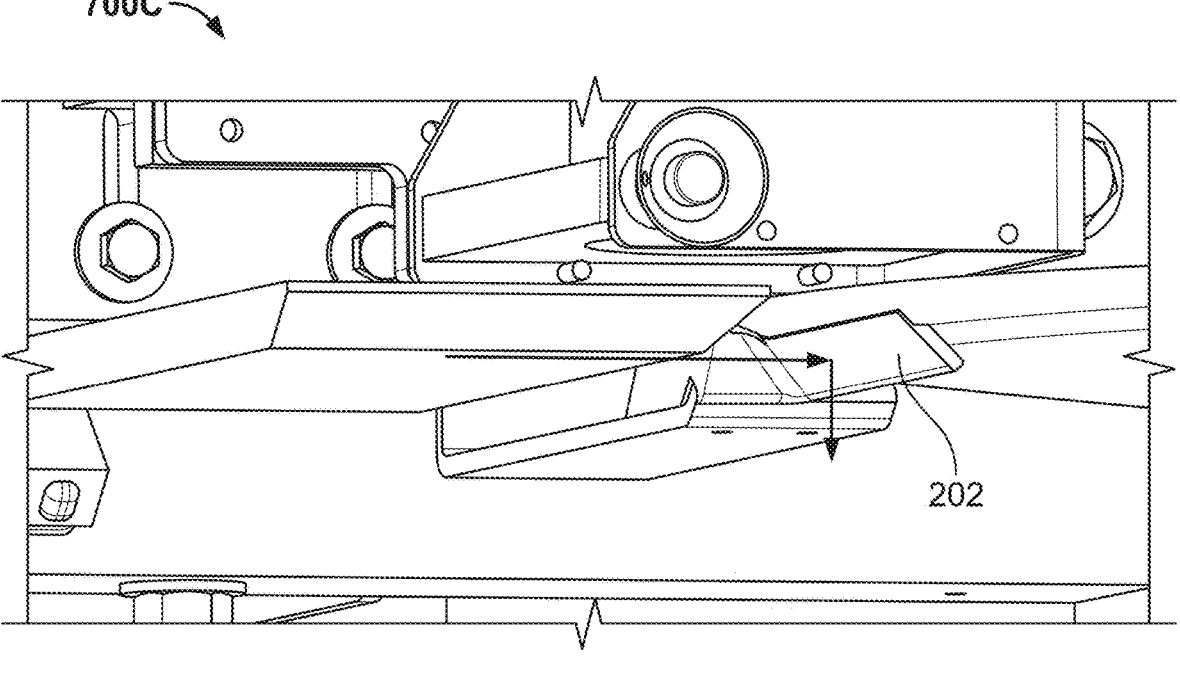
Figures 8A, 8B:
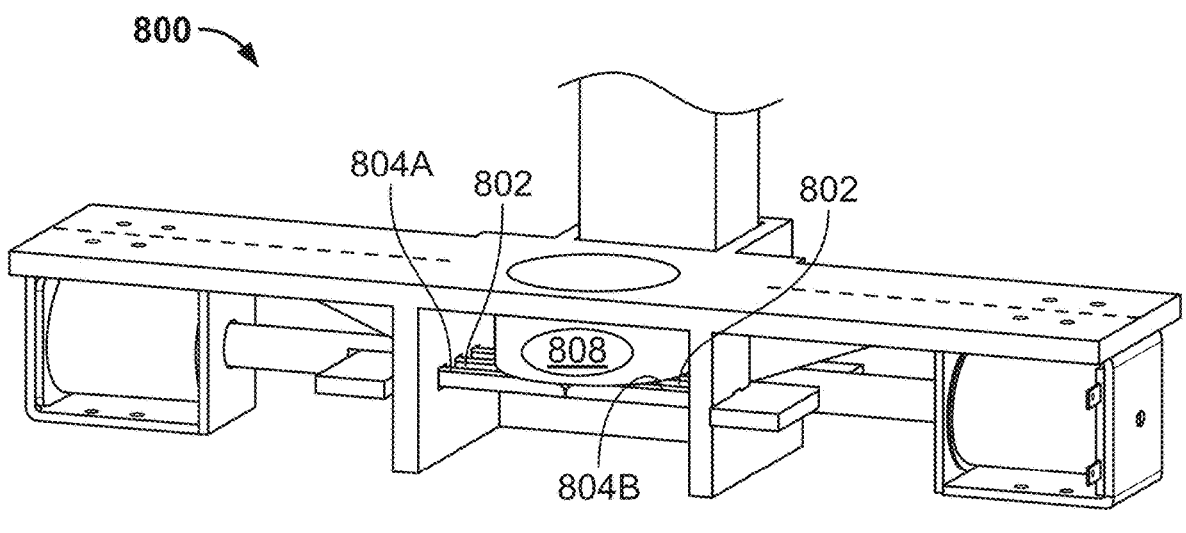
Figure 10A:
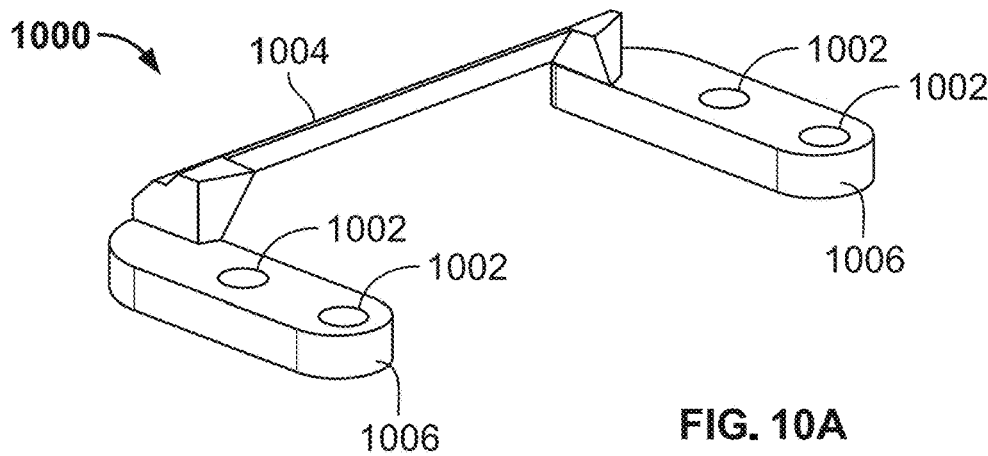
Figure 10B:
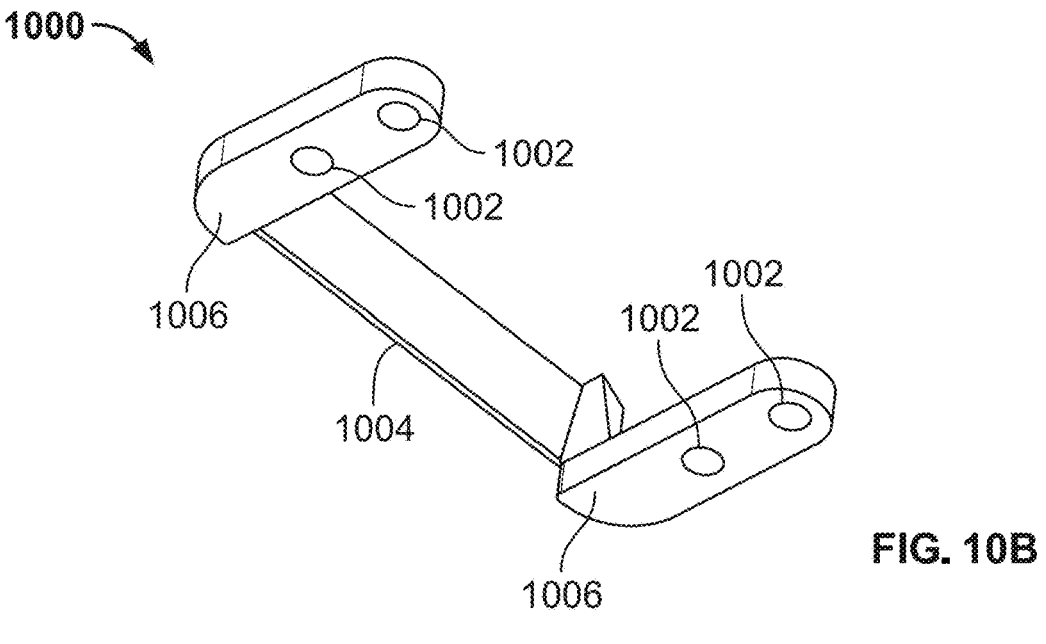
Figure 10C:
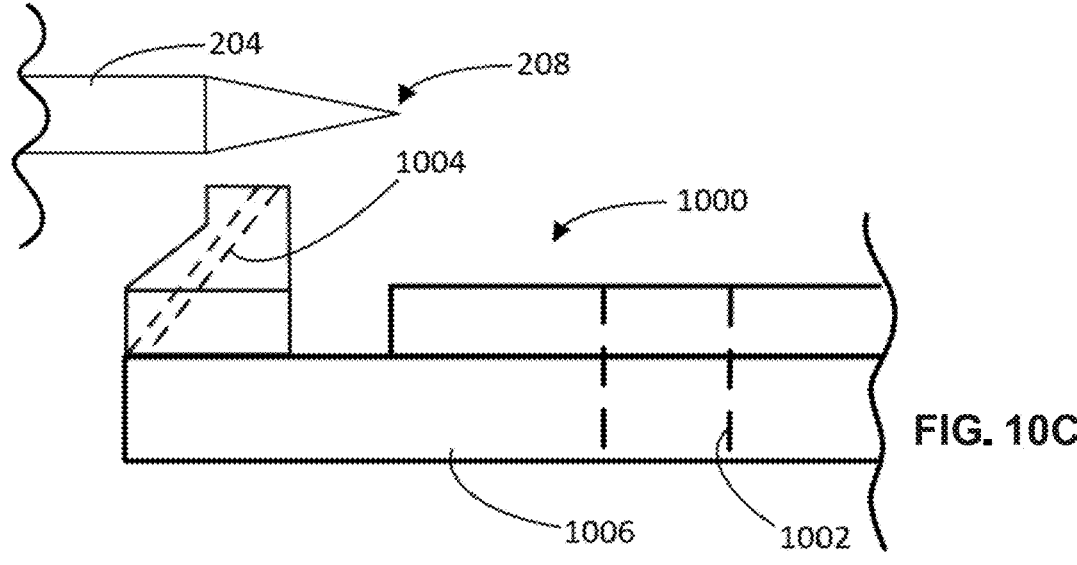

FIGS. 3A, 3B, 3C, 3D, 3E, 3F, and 3G each depict exemplary stages of operation of the apparatus of FIG. 1 slicing a food topping and placing on a consumable item, in accordance with some embodiments of the disclosure, in which:

FIG. 3A illustrates a topping stock in a topping holder prior to being sliced by a blade, according to an example;

FIG. 3B illustrates the topping stock being sliced by the blade, according to an example;

FIG. 3C illustrates the sliced portion created by the blade in FIG. 3B after coming to rest upon a movable shelf and/or alignment plane, in accordance with an example approach;

FIG. 3D illustrates the sliced portion being pushed off of the movable shelf, according to an example;

FIG. 3E illustrates the sliced portion coming to rest upon a landing surface, e.g., of a food ingredient, in accordance with an example;

FIG. 3F illustrates a subsequent portion being sliced from a topping stock, according to an example, according to an example;

FIG. 3G illustrates the subsequent sliced portion after coming to rest upon the landing surface adjacent the initial/ previous sliced portion;

FIG. 4 is a block diagram of an exemplary system configured to execute example methods of the present disclosure, in accordance with some embodiments of the disclosure;

FIG. 5 is a flow chart representing an illustrative process for slicing a food topping for placing on a consumable item, in accordance with some embodiments of the disclosure;

FIG. 6A is a side view of an exemplary deflector for the apparatus of FIG. 1 comprised of food safe material, in accordance with some embodiments of the disclosure;

FIG. 6B is a front view of the exemplary deflector of FIG. 6A, in accordance with some embodiments of the disclosure;

FIG. 6C is a rear view of the exemplary deflector of FIGS. 6B and 6C, in accordance with some embodiments of the disclosure;

FIG. 7A illustrates a perspective view of an exemplary deflector of the apparatus of FIG. 1, in accordance with some embodiments of the disclosure;

FIG. 7B illustrates a side view of the deflector of FIG. 7A, in accordance with some embodiments of the disclosure;

FIG. 7C illustrates a perspective view of the deflector of FIGS. 7A and 7B in the apparatus of FIG. 1, in accordance with some embodiments of the disclosure;

FIG. 8A depicts an illustrative bi-directional landing shelf, e.g., for an apparatus for slicing a food topping, with the landing shelf having two shelf components illustrated in a first position, in accordance with some embodiments of the disclosure;

FIG. 8B depicts the bi-directional landing shelf of FIG. 8B with the two shelf components illustrated in a second position apart from each other, in accordance with some embodiments of the disclosure;

FIG. 9A illustrates a perspective view of an exemplary revolving topping holder configured to slice portions of a food topping from multiple topping stocks, in accordance with some embodiments of the disclosure;

FIG. 9B illustrates a cross-sectional view of the revolving topping holder of FIG. 9A taken along section A-A' of FIG. 9A;

FIG. 10A illustrates an upper rear perspective view of an illustrative deflector for the revolving topping holder apparatus of FIG. 9A, in accordance with some embodiments of the disclosure;

FIG. 10B illustrates a lower rear perspective view of the deflector of FIG. 10A, in accordance with some embodiments of the disclosure; and FIG. 10C illustrates an enlarged side view of the deflector of FIGS. 10A and 10B in the example apparatus of FIG. 9A, in accordance with some embodiments of the disclosure.

DETAILED DESCRIPTION

Apparatuses, methods, and systems are provided herein for slicing a food topping, e.g., for placing on a consumable item.

In the examples herein, the food topping is illustrated as a stick of pepperoni, which is sliced to create pepperoni slices that are positioned upon a pizza dough. However, examples herein may be applied without limitation to other food toppings such as a sausage or any other encased meat product, or any other topping stock that may be sliced. Example apparatuses and methods herein may also be directed to the arrangement or positioning of the sliced food topping upon a pizza dough, a flatbread product, a packaging apparatus surface, or a serving tray, merely as examples.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

FIG. 1 depicts apparatus 100 for slicing a food topping for placing on a consumable item, in accordance with some embodiments of the disclosure. Apparatus 100 may comprise more or fewer than the components or elements depicted in FIG. 1. Apparatus 100 may incorporate or may be incorporated into any or all of the assemblies, systems, or apparatuses shown in FIGS. 2-4 and 6A-6C, 7, 8, 9A, and 9B. Apparatus 100 may also be used, at least in part, to execute method 500 of FIG. 5.

Apparatus 100 may generally be configured to slice and position toppings, which may be positioned upon a pizza dough or other flatbread product, or a tray or plate. Merely by way of example, each of U.S. patent application Ser. No. 16/780,797, filed Feb. 3, 2020, and U.S. Provisional Patent Application No. 62/819,326, filed Feb. 1, 2019, disclose example systems, apparatuses, and methods for producing consumable or food items such as pizza or other food items having one or more toppings, and it is contemplated that apparatus 100 may be used as the example apparatuses or systems disclosed therein, and/or that apparatus 100 may incorporate aspects of the example apparatuses or systems disclosed therein. Accordingly, each of these applications are hereby incorporated by reference herein in their entireties. In the example illustrated in FIG. 1, the apparatus 100 slices portions of a food topping from a topping stock 114, with the slices then falling upon a landing surface 112. The landing surface 112 may have a pizza dough or flatbread positioned upon the landing surface 112, such that the sliced toppings are positioned on the dough/flatbread. The landing surface 112 may be moved within the apparatus 100 such that the toppings are distributed generally evenly about an upper surface of the dough. Apparatus 100 is comprised of topping holder 102, blade 104, alignment plane 106, and pusher 108. Topping stock 114 (e.g., a stick of pepperoni) may be arranged within topping holder 102 through opening 110. When topping stock 114 is arranged within topping holder 102, topping stock 114 is translated towards a cutting edge of blade 104 by pusher 108. Pusher 108 is configured to bring a radially outward surface of topping stock 114 into contact with the blade 104 at a specified height (e.g., based on a preferred topping/pepperoni thickness) such that when the topping stock is cut by the blade 104, a sliced portion of the topping stock falls, e.g., onto landing surface 112. Generally, the sliced topping is sliced in such a manner that it falls upon the landing surface 112 and/or pizza dough positioned on the landing surface 112 in a horizontal position. In some embodiments, landing surface 112 may be rotated in order to dispense sliced topping stock about a surface of a pizza dough (e.g., to create an even pattern of sliced pepperoni on a pizza dough or other food ingredient). In some embodiments, pusher 108 and blade 104 may be adjustable along the radius of landing surface 112 such that toppings may be dispersed between a center point of landing surface 112 (e.g., where a center of a pizza may be arranged) and a radially outer edge of landing surface 112 (e.g., where a crust of a pizza may start). Further, the landing surface 112 may be rotatable. Accordingly, translational and/or rotational movement of the landing surface 112 (relative to the blade 104 and/or topping stock 114 may be employed to distribute sliced toppings about a surface of a pizza dough or other food product. As will be elaborated further below, in some embodiments a deflector (as shown in FIG. 2 and not shown in FIG. 1) may be affixed to or arranged below at least one of alignment plane 106, pusher 108, or landing surface 112 in order to guide a trajectory of sliced topping stock.

Figure 2:
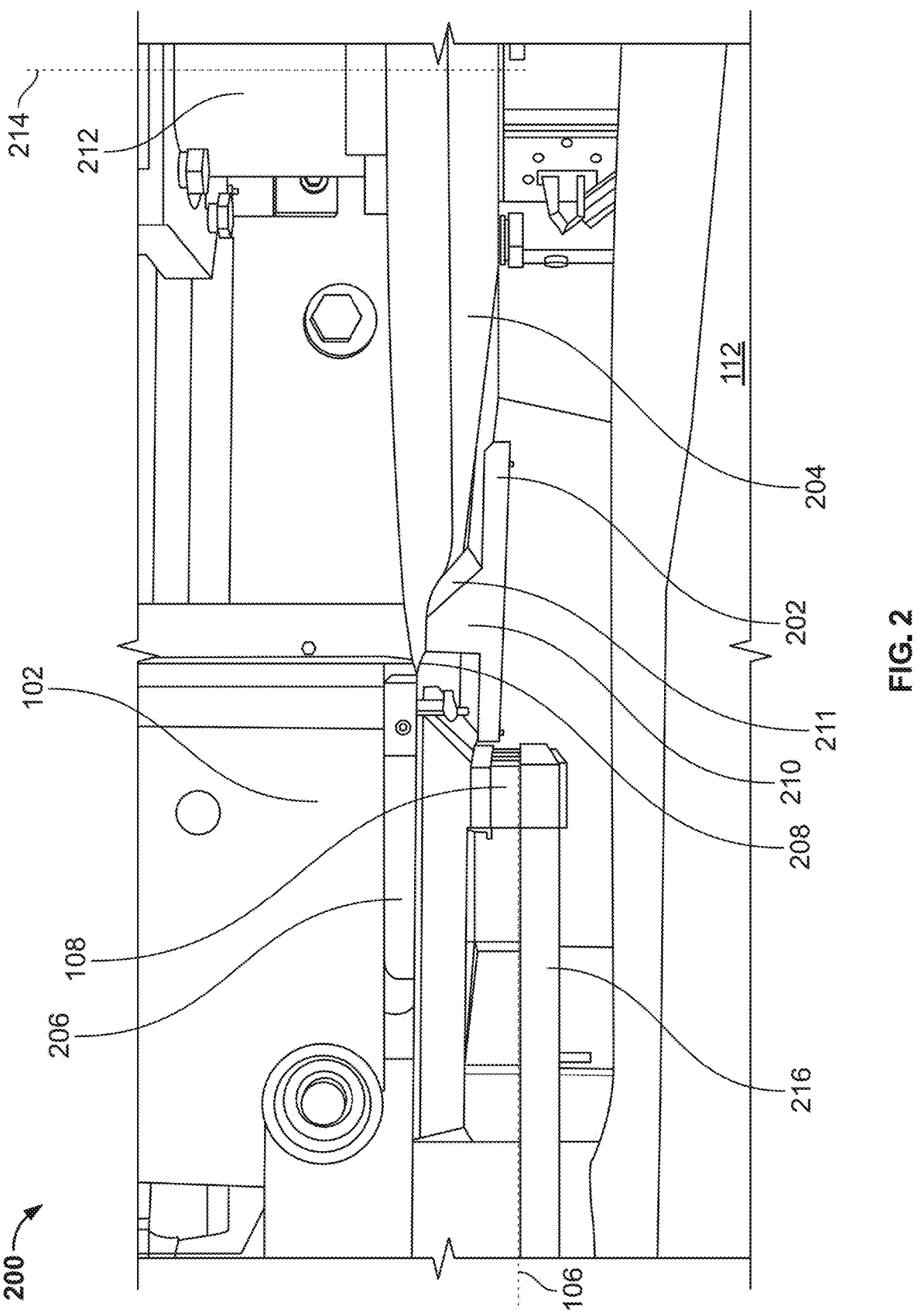
FIG. 2 depicts an illustrative side view of a deflector surface and a rotating blade of the apparatus of FIG. 1, in accordance with some embodiments of the disclosure.

FIG. 2 depicts assembly 200 comprising deflector 202 and rotating blade 204, in accordance with some embodiments of the disclosure. Assembly 200 may comprise more or fewer than the components or elements depicted in FIG. 2. Assembly 200 may incorporate or may be incorporated into any or all of the assemblies, systems, or apparatuses shown in FIGS. 1, 3A-3G, 4 6A-6C, 7, 8, 9A, and 9B. Assembly 200 may also be used, at least in part, to execute method 500 of FIG. 5.

Assembly 200 corresponds to a close up view of a portion of blade 104, alignment plane 106, and pusher 108 of FIG. 1. Topping holder 102 is shown with topping stock 206 being arranged to be sliced by blade edge 208 of rotating blade 204. Rotating blade 204 corresponds to blade 104 of FIG. 1. In some embodiments, blade 104 of FIG. 1 is a rotating blade. For example, rotating blade 204 is illustrated as being rotatably actuated about axis 214 via spindle 212. Movable shelf 216 at least partially defines alignment plane 106, which as described further below may be employed to align sliced portions of pepperoni or other food topping such that the sliced portions fall upon the landing surface 112 in a horizontal orientation. Movable shelf 216 is configured to be actuatable in a manner perpendicular to axis 214 along alignment plane 106 such that topping stock 206 is cut all the way through via rotating blade 204. The sliced portion of the topping stock 206 falls upon the movable shelf 216, which in the example illustrated moves with the topping holder 102 and/or topping stock 206. More specifically, horizontal movement of the shelf 216 defining the alignment plane 106 may be synchronized with or identical to that of the topping holder 102. Accordingly, movement of a slice being separated from the topping stock 206 is also horizontally synchronized with the shelf 216. This may allow the slice being separated from the topping stock 206 to settle relatively quickly upon the shelf 216/alignment plane 106. Pusher 108 is arranged above alignment plane 106 and as the movable shelf 216 travels beneath the pusher 108, the stationary pusher 108 thereby nudges or pushes each slice of topping stock 206 off of the movable shelf 216, permitting the slice to fall downward in a horizontal orientation. Further, since the pusher 108 remains generally stationary, the sliced portion of the topping stock 206 may fall directly downward as the movable shelf 216 moves underneath the pusher 108. In other words, horizontal movement of the fully sliced portion of the topping stock relative to the landing surface 112 is generally stopped before the sliced portion is released vertically by the shelf 216 continuing to travel beneath the pusher 108. Accordingly, the sliced topping stock may have zero horizontal velocity relative to the landing surface 112 as it is released from above the landing surface 112. This may promote alignment of the sliced topping stock, allowing it to fall upon the landing surface 112 or pizza dough positioned on the landing surface 112 and quickly settle into a stationary and horizontal position, e.g., without bouncing or otherwise displacing laterally along the landing surface 112 or pizza dough. The deflector 202 may generally define one or more surfaces positioned to contact slices of the topping stock 206, e.g., a pepperoni or sausage slice, to push them away from the blade edge 208 and/or toward a desired landing location below the rotating blade 204, e.g., onto the movable shelf 216. For example, as illustrated an engagement surface 211 of the deflector 210 is positioned radially inward with respect to the blade edge 208, in addition to being below the rotating blade 204, as the slice is being separated from the topping stock 206. The engagement surface 211 may define an oblique angle with respect to a direction of the relative motion between the topping holder 102 and the blade 204. As the topping stock may be relatively compliant (e.g., a pepperoni may be bent relatively easily), the oblique angle of the engagement surface 211 may cause the sliced topping stock to "curl" away from the blade 204. The engagement surface 211 may define a flat plane. Alternatively, the engagement surface 211 may be curved. In some embodiments, engagement surface 211 is arranged positioned relatively close to the blade edge 208 but with enough clearance between engagement surface 211 and a surface of the sliced topping stock such that the sliced topping stock is able to pass between the blade and engagement surface 211 without excess friction or interference. The clearance may be at least partially defined by the geometry of engagement surface 211 and/or positioning of the engagement surface 211 in close proximity to the blade edge 208 (e.g., a flat profile or a curved profile, depending on the desired thickness of the sliced topping stock and the profile of blade 204). As will be elaborated further below, the engagement surface 211 may generally nudge a radially inward (with respect to the rotating blade 204) portion of a slice being separated from the topping stock 206 by the blade edge 208 downward and/or away from the rotating blade 204. In the example illustrated, the deflector 202 causes the sliced topping to fall upon the extended movable shelf 216. Arranged below movable shelf 216 and deflector 202 is landing surface 112, upon which a food ingredient may be arranged to receive slices of topping stock 206. For example, as noted above the movable shelf 216 may retract beneath the pusher 108 with the sliced topping positioned on the movable shelf 216, such that contact of the sliced topping with the pusher 108 causing the sliced topping to fall downward to the landing surface 112/onto a pizza dough positioned on the landing surface 112.

Components in food equipment that are designated as "Food Contact Zones" may in some applications generally be required to remain cleanable throughout the lifetime of the components. Additionally, in such applications it may be desired that these components generally be free of seams and fasteners in order to prevent topping stock or other consumable items from getting stuck within various features of the components. For example, each of blade 204 and movable shelf 216 may need to be resilient to exposure to topping stock and should also be resistant to wear or mechanical deformation during operation. Obtaining complex geometries with traditional machined parts may be expensive and restricted to intricate designs (e.g., when trying to pair a geometry of deflector 210 and/or engagement surface 211 with blade edge 208). Blade 204 may have a complex, precise profile, and the deflector 210 may need to be positioned as shown to be as closely positioned as possible with respect to the blade 204 while still being safe for food contact. Alternatively, molded components can be used in some examples.

FIGS. 3A, 3B, 3C, 3D, 3E, 3F, and 3G each depict stages of operation 300A, 300B, 300C, 300D, 300E, 300F, and 300G, respectively, of an apparatus for slicing a food topping for placing on a consumable item, in accordance with some embodiments of the disclosure. Each of stages of operation 300A-300G may incorporate more or fewer than the components or elements depicted in FIGS. 3A-3G. Stages of operation 300A-300G may be executed using any or all of the assemblies, systems, or apparatuses shown in FIGS. 1, 2, 4, 6A, 6B, 7, 8, 9A, and 9B. Stages of operation 300A-300G may also correspond to method 500 of FIG. 5 and/or steps or other components of method 500.

As illustrated in FIG. 3A, stage of operation 300A comprises topping holder 102 and movable shelf 216 being translated towards rotating blade 204 along path 302. Topping stock 206 is arranged to translate with the topping holder 102, and thus a lower end of the topping stock 206 comes into contact with an edge of rotating blade 204 (e.g., blade edge 208 of FIG. 2). When topping stock 206 contacts the edge of rotating blade 204, an initial cut in topping stock 206 is made. The cut is arranged at predetermined height 304 along the topping stock 206. Predetermined height 304 may correspond to a preferred thickness of sliced pieces of topping stock 206 to be arranged on a food ingredient positioned below movable shelf 216.

Referring now to FIG. 3B, stage of operation 300B comprises topping holder 102 and movable shelf 216 being translated towards axis 214 of spindle 212 along path 302, thereby increasing the cut radius of blade 204 on topping stock 206 in order to make a through cut and fully separate the slice from the topping stock 206. More specifically, topping stock 206 is cut into a sliced portion 308 of topping stock 206 which contacts deflector 210 at the engagement surface 211, causing the edge of the sliced portion 308 to be deflected away from the blade 204. Movable shelf 216 may be configured to stop translating before intersecting with axis 214 to prevent an edge or surface of blade 204 from contacting any feature or component of movable shelf 216.

Referring now to FIG. 3C, stage of operation 300C comprises topping stock 206 being cut all the way through to create separated sliced portion 308, which is completely sliced off and separated from the topping stock 206. The engagement surface 211 of the deflector 210 may generally nudge a leading edge of the sliced portion 308 away from the blade 204, thereby preventing rotational motion of the blade 204 from contacting the sliced portion 308. Separated sliced portion 308 may land upon alignment plane 106, which is at least partially defined by movable shelf 216. The lack of contact between the sliced portion 308 and rotating blade 204 promoted by the deflector 210 may help the sliced portion 308 to relatively quickly "settle" upon the movable shelf 216 and/or alignment plane 106. Vertical movement of separated sliced portion 308 ceases and the separated sliced portion 308 rests upon an upper surface of the movable shelf 216 corresponding to the alignment plane 106.

Referring now to FIG. 3D, stage of operation 300D comprises translating movable shelf 216 along return path 310, which has a trajectory away from axis 214 of spindle 212. Separated sliced portion 308 is settled upon the movable shelf 216 and is carried by the movable shelf 216 (e.g., along alignment plane 106) towards pusher 312. Pusher 312 contacts separated sliced portion 308 and separated sliced portion 308 is pushed off movable shelf 216 via contact with pusher 312 as movable shelf 216 translates along return path 310. More specifically, the pusher 312 may be stationary, such that movement of the movable shelf 216 causes the separated sliced portion 308 to be pushed off of the movable shelf 216. As end 314 of movable shelf 216 passes edge 316 of pusher 312, separated sliced portion 308 falls downwards towards a surface where a food ingredient may be arranged (e.g., landing surface 112 of a pizza dough as shown in FIGS. 1 and 2). Further, as noted above since the pusher 312 is stationary, the sliced potion 308 falls from the movable shelf 216 with substantially zero horizontal velocity.

Referring now to FIG. 3E, stage of operation 300E comprises separated sliced portion 308 being guided into a horizontal position on landing surface 112 by the edge 316 of pusher 312. A relatively short vertical distance 318 between landing surface 112 and alignment plane 106 as well as the substantially zero horizontal velocity of the sliced portion 308 promoted by the stationary pusher 312 may enhance the speed with which the separated sliced portion 308 settles upon a food ingredient (e.g., a pizza dough) in the depicted horizontal position. As noted above, the deflector surface 211 is arranged to prevent contact between the sliced portion 308 and the rotating blade 204, preventing the rotating blade 204 from propelling the sliced portion laterally. Further, the stationary pusher 312 allows the sliced potion 308 to fall downward with little to no horizontal movement once it has been separated from topping stock 206 of FIGS. 3A and 3B and rests upon the movable shelf 216. By reducing or eliminating the horizontal movement in these ways, the separated sliced portion 308 is prevented from being accelerated or flung away from fast rotating movement of blade 204. Further, a lack of horizontal movement or acceleration causes separated sliced portion 308 to fall along a primarily downward trajectory (e.g., the downward velocity or acceleration exceeds the horizontal velocity or acceleration of separated sliced portion 308) and, at a minimum, quickly settle upon the pizza dough positioned upon the landing surface 112.

Turning now to FIG. 3F, stage of operation 300F corresponds slicing a subsequent portion of topping stock 206 by moving topping holder 102 and movable shelf 216 along path 302 towards axis 214 of spindle 212. In other words, the topping holder 102 may generally repeat the movement toward the blade 204. Topping stock 206 is again brought into contact with an edge of rotating blade 204 (e.g., blade edge 208 of FIG. 2) to start forming second sliced portion 320 of topping stock 206.

Referring now to FIG. 3G, stage of operation 300G shows relative motion 323 of at least one of landing surface 112 or a food ingredient (e.g., a pizza dough) arranged on landing surface 112. Relative motion 323 results in second sliced portion 320 being arranged horizontally on at least one of landing surface 112 or a food ingredient arranged on landing surface 112 such that second sliced portion 320 is arranged at position 322, which is different than position 324 of separated sliced portion 308. Relative motion 323 may include a rotational and/or translational movement of the landing surface 112 relative to the spindle 212 to enable an intentionally even distribution of sliced topping stock about landing surface 112 or a food ingredient arranged on landing surface 112. For example, the landing surface 112 may be rotatable about an axis. Alternatively, or in addition, the landing surface 112 may be horizontally movable relative to the blade 204 and/or spindle 212, e.g., such that an axis of rotation of the landing surface 112 shifts horizontally with respect to spindle 212. Accordingly, relative rotation and/or translation of the landing surface 112 may be employed to position multiple slices of the topping stock, e.g., pepperonis, about a pizza dough positioned on the landing surface 112.

FIG. 4 shows a block diagram of a topping stock slicing system 400 configured to execute methods described herein, in accordance with some embodiments of the disclosure. Topping stock slicing system 400 may comprise more or fewer than the components or elements depicted in FIG. 4. Topping stock slicing system 400 may incorporate or may be incorporated into any or all of the assemblies, systems, or apparatuses shown in FIGS. 1, 2, 3A-3G, 6A, 6B, 7, 8, 9A, and 9B. Topping stock slicing system 400 may also be used to execute method 500 of FIG. 5.

Topping stock slicing system 400 comprises communication networks 406 and 456, which may include one or more network systems, such as, without limitation, Internet, LAN, Wi-Fi, or other network systems suitable for communicating instructions based on user inputs (e.g., transmitting a desired topping selection, amount, and/or layout for a food product). In some embodiments, the system of FIG. 4 excludes server 404, and functionality that would otherwise be implemented by server 404 is instead implemented by other components of the system depicted by FIG. 4, such as one or more components of communication networks 406 and 456. In still other embodiments, server 404 works in conjunction with one or more components of communication networks 406 and 456 to implement certain functionality described herein in a distributed or cooperative manner. Similarly, in some embodiments, the system depicted by FIG. 4 excludes computing device 402, and functionality that would otherwise be implemented by computing device 402 is instead implemented by other components of the system depicted by FIG. 4, such as one or more components of communication networks 406 and 456 or server 404 or a combination of the same. In other embodiments, computing device 402 works in conjunction with one or more components of communication networks 406 and 456 or server 404 to implement certain functionality described herein in a distributed or cooperative manner. In some embodiments, all communications may occur over a single communication network (e.g., communication network 406 or communication network 456). Features and operations described herein in connection with communication networks 406 and 456 may be performed by either communication network 406 or communication network 456.

Computing device 402 includes control circuitry 408, display 410 and input/output circuitry 412. Control circuitry 408 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 408 in turn includes communication circuitry 426, storage 422 and processing circuitry 418. In some embodiments, computing device 402 or control circuitry 408 may be configured as varying embodiments, or combinations of varying embodiments, of apparatus 100 of FIG. 1 or any other systems, subsystems, apparatuses, and assemblies of the present disclosure. For example, either or both of computing device 402 or control circuitry 408 may be utilized in combination with at least one actuation device, system, or assembly to enable one or more components of apparatus 100 to be controlled remotely based on various food ingredient combination or preparation settings.

In addition to control circuitry 408 and 434, computing device 402 and server 404 may each include storage (storage 422, and storage 438, respectively). Each of storages 422 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 422 and 438 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 422 and 438 or instead of storages 422 and 438. In some embodiments, a user profile and messages corresponding to a chain of communication may be stored in one or more of storages 422 and 438.

In some embodiments, control circuitry 408 and/or 434 executes instructions for an application stored in memory (e.g., storage 422 and/or storage 438). For example, the application may correspond to a user accessible interface for selecting various toppings to combine with a food ingredient (e.g., one or more toppings to place on a pizza dough). Specifically, control circuitry 408 and/or 434 may be instructed by the application to perform the functions discussed herein. In some implementations, any action performed by control circuitry 408 and/or 434 may be based on instructions received from the application. For example, the application may be implemented as software or a set of executable instructions that may be stored in storage 422 and/or 438 and executed by control circuitry 408 and/or 434. In some embodiments, the application may be a client/server application where only a client application resides on computing device 402, and a server application resides on server 404.

The application may be implemented using any suitable architecture. For example, it may be a stand-alone application wholly implemented on computing device 402. In such an approach, instructions for the application are stored locally (e.g., in storage 422), and data for use by the application is downloaded on a periodic basis (e.g., from an out-of-band feed, from an Internet resource, or using another suitable approach). Control circuitry 408 may retrieve instructions for the application from storage 422 and process the instructions to perform the functionality described herein. Based on the processed instructions, control circuitry 408 may determine a type of action to perform in response to input received from input/output circuitry 412 or from communication networks 406 and 456. For example, in response to either a first or second computing device receiving a message from either the first or second computing device, control circuitry 408 may perform the steps process 500 of FIG. 5.

In client/server-based embodiments, control circuitry 408 may include communication circuitry suitable for communicating with an application server (e.g., server 404) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication networks 406 and 456). In another example of a client/server-based application, control circuitry 408 runs a web browser that interprets web pages provided by a remote server (e.g., server 404). For example, the remote server may store the instructions for the application in a storage device. The remote server may process the stored instructions using circuitry (e.g., control circuitry 434) and/or generate displays. Computing device 402 may receive the displays generated by the remote server and may display the content of the displays locally via display 410. This way, the processing of the instructions is performed remotely (e.g., by server 404) while the resulting displays, such as the display windows described elsewhere herein, are provided locally on computing device 402. Computing device 402 may receive inputs from the user via input/output circuitry 412 and transmit those inputs to the remote server for processing and generating the corresponding displays. Alternatively, computing device 402 may receive inputs from the user via input/output circuitry 412 and process and display the received inputs locally, by control circuitry 408 and display 410, respectively.

Server 404 and computing device 402 may transmit and receive content and data such as media content via communication networks 406 and 456. For example, server 404 may be a food ordering server, and computing device 402 may be a remote smart device configured to transmit and receive instructions related to a food ordering or preparation service from server 404. Control circuitry 434, 408 may send and receive commands, requests, and other suitable data through communication networks 406 and 456 using communication circuitry 432, 426, respectively. Alternatively, control circuitry 434, 408 may communicate directly with each other using communication circuitry 432, 426, respectively, avoiding communication networks 406 and 456.

It is understood that computing device 402 is not limited to the embodiments and methods shown and described herein. In nonlimiting examples, computing device 402 may be a digital storage device, a digital media receiver (DMR), a digital media adapter (DMA), a streaming media device, a local media server, a BLU-RAY player, a BLU-RAY recorder, a personal computer (PC), a laptop computer, a tablet computer, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 402 receives user input 414 at input/output circuitry 412. For example, computing device 402 may receive a user input such as a user swipe or user touch. It is understood that computing device 402 is not limited to the embodiments and methods shown and described herein. User input 414 may be received from a user selection-capturing interface that is separate from device 402, such as a remote-control device, trackpad, or any other suitable user movement-sensitive, audio-sensitive or capture devices, or as part of device 402, such as a touchscreen of display 410. Transmission of user input 414 to computing device 402 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, or any other suitable wireless transmission protocol. Input/output circuitry 412 may include a physical input port such as a 3.5 mm audio jack, RCA audio jack, USB port, ethernet port, or any other suitable connection for receiving audio over a wired connection, or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 418 may receive user input 414 from input/output circuitry 412 using communication path 416. Processing circuitry 418 may convert or translate the received user input 414 that may be in the form of audio data, visual data, gestures, or movement to digital signals. In some embodiments, input/output circuitry 412 performs the translation to digital signals. In some embodiments, processing circuitry 418 (or processing circuitry 436, as the case may be) carries out disclosed processes and methods.

Processing circuitry 418 may provide requests to storage 422 by communication path 420. Storage 422 may provide requested information to processing circuitry 418 by communication path 446. Storage 422 may transfer a request for information to communication circuitry 426 which may translate or encode the request for information to a format receivable by communication network 406 before transferring the request for information by communication path 428. Communication network 406 may forward the translated or encoded request for information to communication circuitry 432, by communication paths 430.

At communication circuitry 432, the translated or encoded request for information, received through communication path 430, is translated or decoded for processing circuitry 436, which will provide a response to the request for information based on information available through control circuitry 434 or storage 438, or a combination thereof. The response to the request for information is then provided back to communication network 406 by communication path 440 in an encoded or translated format such that communication network 406 can forward the encoded or translated response back to communication circuitry 426 by communication path 442.

At communication circuitry 426, the encoded or translated response to the request for information may be provided directly back to processing circuitry 418 by communication path 454, or may be provided to storage 422 through communication path 444, which then provides the information to processing circuitry 418 by communication path 446. Processing circuitry 418 may also provide a request for information directly to communication circuitry 426 though communication path 452, where storage 422 responds to an information request, provided through communication path 420 or 444, by communication path 424 or 446 that storage 422 does not contain information pertaining to the request from processing circuitry 418.

Processing circuitry 418 may process the response to the request received through communication paths 446 or 454 and may provide instructions to display 410 for a notification to be provided to the users through communication path 448. Display 410 may incorporate a timer for providing the notification or may rely on inputs through input/output circuitry 412 from the user, which are forwarded through processing circuitry 418 through communication path 448, to determine how long or in what format to provide the notification. When display 410 determines the display has been completed, a notification may be provided to processing circuitry 418 through communication path 450.

Apparatus 100 of FIG. 1 may be communicatively coupled to communication networks 406 and 456 in order to transmit and receive instructions, statuses, and data to each of server 404 and computing device 402. The instruction may be transmitted via communication stream 428 to communication network 406, which then transmits the instruction with a status update to both communication circuitry 432, corresponding to server 404 (e.g., a food preparation or ordering server), via communication stream 430 and to apparatus 100 via communication stream 458. Additionally, server 404 may also transmit a redundant security encoded iteration of the instruction to confirm the instruction with apparatus 100 by transmitting a message via communication stream 460 through communication network 456 which is received at apparatus 100 via communication stream 462.

Once the instructions are completed, apparatus 100 may provide new data and a new status update to computing device 402 via communication stream 464 through communication network 406 and/or may transmit the same data and/or status update to server 404 via communication network 456 using communication streams 466 and 468.

The communication paths provided in FIG. 4 between computing device 402, server 404, communication network 406, and all subcomponents depicted are exemplary and may be modified to reduce processing time or enhance processing capabilities for each step in the processes disclosed herein by one skilled in the art.

FIG. 5 is a flow chart representing process 500 for slicing a food topping for placing on a consumable item, in accordance with some embodiments of the disclosure. Process 500 may comprise more or fewer than steps depicted in FIG. 5 (e.g., process blocks 506-512 may be considered to characterize additional embodiments of a method comprised of at least process blocks 502 and 504). Process 500 may be executed by any or all of the assemblies, systems, or apparatuses shown in FIGS. 1-4, 6A, 6B, 7, 8, 9A, and 9B.

At 502, a topping holder is provided that is configured to hold a topping stock. At 504, the topping stock is sliced via relative motion between the topping holder and a blade. At 506, a sliced portion of the topping stock such that the sliced portion is substantially parallel with the food ingredient positioned below the blade as the sliced portion falls to the food ingredient, the sliced portion having substantially zero horizontal velocity with respect to the food ingredient. At 508, an alignment plane is positioned below the blade such that a sliced portion of the topping stock falls upon the alignment plane to a horizontally flat position, wherein the alignment plane is movable with respect to the food ingredient positioned below the alignment plane. At 510, the sliced portion is pushed off of the alignment plane onto the food ingredient, thereby aligning the sliced portion with the food ingredient. At 512, a leading edge of the sliced portion of the topping stock is deflected away from the blade as the sliced portion moves relative to the blade, thereby aligning the sliced portion with the food ingredient.

FIGS. 6A, 6B, and 6C depict exemplary components 600A, 600B, and 600C, respectively, comprised of food safe material, in accordance with some embodiments of the disclosure. In some embodiments, each of components 600A, 600B, and 600C correspond to an edge of at least one deflector of the present disclosure. Each of components 600A, 600B, and 600C may comprise more or fewer than the components or elements depicted in FIGS. 6A-6C. Each of components 600A, 600B, and 600C may incorporate or may be incorporated into any or all of the assemblies, systems, or apparatuses shown in FIGS. 1-4 and 7A-7C, 8, 9A, and 9B. Each of components 600A, 600B, and 600C may be incorporated into an apparatus (e.g., apparatus 100 of FIG. 1), system, or assembly of the present disclosure may also be used to execute method 500 of FIG. 5 (e.g., for deflector 210 of FIG. 2)

FIGS. 7A and 7B depict view 700A and view 700B of deflector 202, in accordance with some embodiments of the disclosure. FIG. 7C depicts view 700C where deflector 202 is arranged to receive a sliced portion of a topping stock, in accordance with some embodiments of the disclosure. Deflector 202 may comprise more or fewer than the components or elements depicted in FIGS. 7A-7C. Deflector 202 may incorporate or may be incorporated into any or all of the assemblies, systems, or apparatuses shown in FIGS. 1-4, 6A-6C, 8, 9A, and 9B. Deflector 202 may also be used to execute method 500 of FIG. 5. As shown in FIGS. 7A and 7B, engagement surface 211 of FIG. 2 is arranged to guide a sliced portion of topping stock away from the topping stock and downwards towards a landing surface for the sliced topping stock (e.g., a pizza dough).

FIGS. 8A and 8B depicts bi-directional landing shelf 800 in both a topping catching configuration (e.g., as shown in FIG. 8A) and a topping releasing configuration (e.g., as shown in FIG. 8B), in accordance with some embodiments of the disclosure. Bi-directional landing shelf 800 may comprise more or fewer than the components or elements depicted in FIGS. 8A and 8B. Bi-directional landing shelf 800 may incorporate or may be incorporated into any or all of the assemblies, systems, or apparatuses shown in FIGS. 1-4, 6A-6C, 7A-7C, 9A, and 9B. Bi-directional landing shelf 800 may also be used to execute method 500 of FIG. 5.

Bi-directional landing shelf 800 comprises pull away shelves 802. Each of pull away shelves 802 define alignment planes 804A and 804B, respectively, which may be arranged to correspond to alignment plane 106 of FIGS. 1 and 2. Accordingly, a sliced topping portion 808 may rest upon the alignment planes 804A/804B of the shelves as illustrated in FIG. 8A. Pull away shelves 802 are configured to move in opposite directions along paths 806A and 806B, respectively, as shown in FIG. 8B. The movement of each of pull away shelves 802 may cause the sliced topping portion 808 to vertically descend towards a food ingredient (e.g., a pizza dough having a landing surface 112 such as illustrated in FIG. 1), which may be arranged below each of pull away shelves 802. The sliced topping portion 808 may be released as the shelves 802 are moved apart. More specifically, as the shelves 802 move away from each other, opposing ends of the sliced portion 808 rest upon both shelves 802 until the shelves 802 are far enough apart that the sliced topping portion 808 falls between the shelves 802. In this manner, the sliced portion 808 may tend to fall vertically downward and/or with substantially zero horizontal velocity toward the landing surface 112 (not shown in FIGS. 8A/8B). Sliced topping 808 is shown first being caught by alignment planes 804A and 804B in FIG. 8A. Sliced topping 808 then follows trajectory 810 as alignment planes 804A and 804B are pulled away from each other, allowing sliced topping 808 to descend towards a product (e.g., a pizza dough).

FIGS. 9A and 9B depict a topping slicing assembly 900 comprising rotating topping holder 902 configured to receive a plurality of topping stocks 912, in accordance with some embodiments of the disclosure. Topping slicing assembly 900 may comprise more or fewer than the components or elements depicted in FIGS. 9A and 9B. Topping slicing assembly 900 may incorporate or may be incorporated into any or all of the assemblies, systems, or apparatuses shown in FIGS. 1-4, 6A-6C, 7A-7C, 8A, and 8B. For example, topping slicing assembly 900 may be employed in the apparatus 100 to slice pepperonis from multiple topping stocks for placement upon a landing surface 112 and/or a pizza dough. Topping slicing assembly 900 may also be used to execute method 500 of FIG. 5.

Topping slicing assembly 900 comprises rotating topping holder 902 arranged to interface with rotating blade 204 and feeds sliced topping stock to deflector 1000, which deflects each separated sliced portion 308 as it is cut by the rotating blade 204. As will be described further below, the deflector 1000 comprises an engagement surface that generally pushes a leading edge of a sliced topping stock away from rotating blade 204, thereby preventing the blade 204 from propelling the sliced topping stock horizontally or otherwise imparting undesired movement to the sliced topping stock as it descends to a landing surface below the rotating blade 204.

As shown via cross section A-A' in FIG. 9B, rotating topping stock holder 902 comprises a plurality of individual topping stock holders 904. Each of individual topping stock holders 904 may comprise a geometry suitable for guiding a single topping stock, e.g., an encased meat such as pepperoni, towards rotating blade 204. For example, if the desired topping stock is a cylindrical pepperoni, then each of topping stock holders 904 may comprise cylindrical holders of a suitable height. In some embodiments, each of topping stock holders 904 may comprise different geometries for different toppings (e.g., one for a bell pepper, one for mushrooms, one for packaged deli meat, or one for cylindrical pepperoni stock). Rotating topping holder 902 is affixed to a mounting surface or platform above the blade 204 via securing feature 906. Securing feature 906 may comprise a nut, a threaded portion, food-safe adhesive, or any combination thereof to either secure rotating topping holder 902 to a mounting surface or to enable rotating topping holder 902 to rotate about securing feature 906 without interference. Platform 908 may generally provide rigid support for each of the individual topping stock holders 904. Platform 908 may comprise food safe material. Platform 908 may be configured to rotate about a center of the platform 908, e.g., co-located with the securing feature 906, along a rotational trajectory 910 based on an input (e.g., by manual actuation or via an actuator, motor, or the like) to change which of topping stock holder 904 are to expose their topping stock to rotating blade 204. The platform 908 may alternatively rotate in an opposite direction to the rotational trajectory 910 illustrated. In at least some examples, multiple or all of the topping stock holders 904 may have respective topping stocks 912 that are exposed to the blade 204, and as such for each revolution of the platform 908 each of the exposed topping stocks 912 are cut to provide a respective sliced portion. Accordingly, sliced portions may be created relatively quickly via rotational motion of the platform in the example illustrated in FIGS. 9A and 9B.

As noted above, the assembly 900 may include additional components not illustrated. Merely as one example, a movable shelf and/or alignment plane may be provided, e.g., similar to the movable shelf 216 defining alignment plane 106 illustrated in the examples of FIGS. 1, 2, and 3A-3G. In such examples, the movable shelf 216 (not shown in FIGS. 9A and 9B) may move "back-and-forth" in similar manner as described in other example approaches herein. Accordingly, sliced portions of a topping stock may come to rest upon the moveable shelf before being dropped or lowered to a landing surface below, e.g., of a food ingredient. When employed in connection with the revolving/circular motion example assembly 900 illustrated in FIG. 9A, the movable shelf 216 (not shown in FIG. 9A) may move in a linear motion aligned parallel to a tangent of the circle defined by the platform 908, or otherwise so that the back-and-forth movement of the shelf/alignment plane is generally aligned with the trajectory of sliced portions as they are cut from their respective topping stocks 912 by the blade edge 208.

FIGS. 10A, 10B and 10C each depict views of the deflector 1000 of the assembly 900, in accordance with some embodiments of the disclosure. Deflector 1000 may comprise more or fewer than the components or elements depicted in FIGS. 10A and 10B. Deflector 1000 may incorporate or may be incorporated into any or all of the assemblies, systems, or apparatuses shown in FIGS. 1-4, 6A-6C, 7A-7C, 8A, 8B, 9A, and 9B. For example, deflector 1000 may be employed in place of deflector 202 of FIG. 2 or may be employed in the assembly 900 illustrated in FIG. 9A. Deflector 1000 comprises mounting holes 1002 which are formed to extend through mounting tabs 1006 on either side of the deflector surface 1004. Deflector surface 1004 has an angled surface defining a generally planar profile, although other profiles of the surface 1004 may be employed. Generally, the deflector surface 1004 guides sliced portions of toppings away from blade edge 208, which is shown in an example positioning relative to deflector 1000 in FIG. 10C. As illustrated, portions of topping stock (not shown in FIG. 10C) may be deflected downward and away from the rotating blade 204 by the deflector surface 1004 as the topping stock is cut by the blade edge 208. More specifically, a topping stock may be moved against the blade edge 208 (right to left in FIG. 10C), and as the blade edge 208 penetrates the topping stock the sliced portion is initially pushed downward by the cutting of the blade edge 208. The slice or portion may bend or curl downward as the blade edge 208 continues to penetrate the topping stock (not shown in FIG. 10C), with the free end of the slice contacting the deflector surface 1004 and being pushed further downward and away from the rotating blade 204 as the topping stock continues to move across the blade edge 208. Accordingly, the engagement surface 1004 of the deflector 1000 generally prevents the sliced portion from coming back into contact with the rotating blade 204 once cut by the blade edge 208, thereby preventing the sliced portion from being "spun off" from such contact with the rotating blade 204.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples, any such reference is merely to provide context to the instant disclosure and does not form any admission as to what constitutes the state of the art.

What is claimed is:

1. An apparatus for slicing a food topping for placing upon a food ingredient, the apparatus comprising:
   a topping holder configured to position a topping stock;
   a blade configured to slice the topping stock via relative motion between the topping holder and the blade;
   a deflector configured to force a leading edge of a sliced portion of the topping stock away from the blade as the sliced portion moves relative to the blade; and
   an alignment plane positioned below the blade such that the sliced portion of the topping stock falls upon the alignment plane to a horizontally flat position on the alignment plane, wherein the alignment plane is movable with respect to the food ingredient positioned below the alignment plane.

2. The apparatus of claim 1, further comprising a pusher configured to move the sliced portion off of the alignment plane onto the food ingredient.

3. The apparatus of claim 2, wherein the alignment plane and the pusher are configured to place the sliced portion of the topping stock upon the food ingredient such that the sliced portion of the topping stock has substantially zero horizontal velocity with respect to the food ingredient.

4. The apparatus of claim 1, wherein the food ingredient includes one or more of a dough, a sauce, or a cheese.

5. The apparatus of claim 1, wherein the topping stock is an encased meat.

6. The apparatus of claim 1, wherein the blade is a rotating blade.

7. The apparatus of claim 1, wherein the deflector defines an engagement surface configured to contact the leading edge of the sliced portion of the topping stock.

8. The apparatus of claim 7, wherein the engagement surface defines an oblique angle with respect to a direction of the relative motion between the topping holder and the blade.

9. The apparatus of claim 7, wherein the engagement surface defines a flat plane.

10. The apparatus of claim 1, wherein the topping holder is configured to hold a plurality of topping stocks.

11. An apparatus for slicing a food topping for placing upon a food ingredient, the apparatus comprising:
    a topping holder configured to position a topping stock;
    a blade configured to slice the topping stock via relative motion between the topping holder and the blade;
    an alignment plane positioned below the blade such that a sliced portion of the topping stock falls upon the alignment plane to a horizontally flat position, wherein the alignment plane is movable with respect to the food ingredient positioned below the alignment plane; and
    a pusher configured to move the sliced portion off of the alignment plane onto the food ingredient.

12. The apparatus of claim 11, wherein the alignment plane and the pusher are configured to place the sliced portion of the topping stock upon the food ingredient such that the sliced portion of the topping stock has substantially zero horizontal velocity with respect to the food ingredient.

13. The apparatus of claim 11, wherein the pusher is stationary with respect to the topping holder.

14. A method of slicing a food topping for placing upon a food ingredient, the method comprising:
    providing a topping holder configured to hold a topping stock;
    slicing the topping stock via relative motion between the topping holder and a blade;
    deflecting a leading edge of a sliced portion of the topping stock away from the blade as the sliced portion moves relative to the blade; and
    positioning an alignment plane below the blade such that a sliced portion of the topping stock falls upon the alignment plane to a horizontally flat position, wherein the alignment plane is movable with respect to the food ingredient positioned below the alignment plane.

15. The method of claim 14, wherein deflecting the leading edge of the sliced portion of the topping stock away from the blade comprises contacting the sliced portion with an engagement surface of a deflector positioned adjacent the blade.

16. The method of claim 15, further comprising orienting the engagement surface such that the engagement surface defines an oblique angle with respect to a direction of the relative motion between the topping holder and the blade.

17. The method of claim 14, further comprising: pushing the sliced portion off of the alignment plane onto the food ingredient, thereby aligning the sliced portion with the food ingredient.

18. The method of claim 14, further comprising aligning a sliced portion of the topping stock such that the sliced portion is substantially parallel with the food ingredient positioned below the blade as the sliced portion falls to the food ingredient, the sliced portion having substantially zero horizontal velocity with respect to the food ingredient.

* * * * *